United States Patent [19]

Panten et al.

[11] Patent Number: 4,924,668
[45] Date of Patent: May 15, 1990

[54] DEVICE FOR EXHAUST GAS RECIRCULATION IN DIESEL ENGINES

[75] Inventors: Detlef Panten, Korb; Jürgen Jegelka, Aichwald, both of Fed. Rep. of Germany

[73] Assignee: Daimler-Benz AG, Fed. Rep. of Germany

[21] Appl. No.: 413,603

[22] Filed: Sep. 28, 1989

[30] Foreign Application Priority Data

Oct. 6, 1988 [DE] Fed. Rep. of Germany ....... 3833957

[51] Int. Cl.$^5$ ............................................ F02M 25/06
[52] U.S. Cl. ..................................... 60/278; 123/568
[58] Field of Search ............................ 60/278; 123/568

[56] References Cited

U.S. PATENT DOCUMENTS

| | | | |
|---|---|---|---|
| 2,757,654 | 8/1956 | White | 123/568 |
| 3,042,014 | 7/1962 | Falzone | 123/568 |
| 3,733,827 | 5/1973 | Suzuki | 60/278 |
| 4,087,966 | 5/1978 | Akado | 60/278 |

*Primary Examiner*—Douglas Hart
*Attorney, Agent, or Firm*—Evenson, Wands, Edwards, Lenahan & McKeown

[57] ABSTRACT

A device for exhaust gas recirculation in diesel engines is described, in which an exhaust filter for the recirculated exhaust gas is arranged in an exhaust gas recirculation pipe branching off from the exhaust pipe. This exhaust filter insert is arranged in the branch of the exhaust gas recirculation pipe in such a way that its surface on the contamination side lies approximately parallel to the direction of flow of the main exhaust gas stream, to be precise in the region and course of a normal flow line close to the wall. In a preferred embodiment, the filter insert consists of a dimensionally stable porous pipe of sintered ceramic or sintered metal.

11 Claims, 1 Drawing Sheet

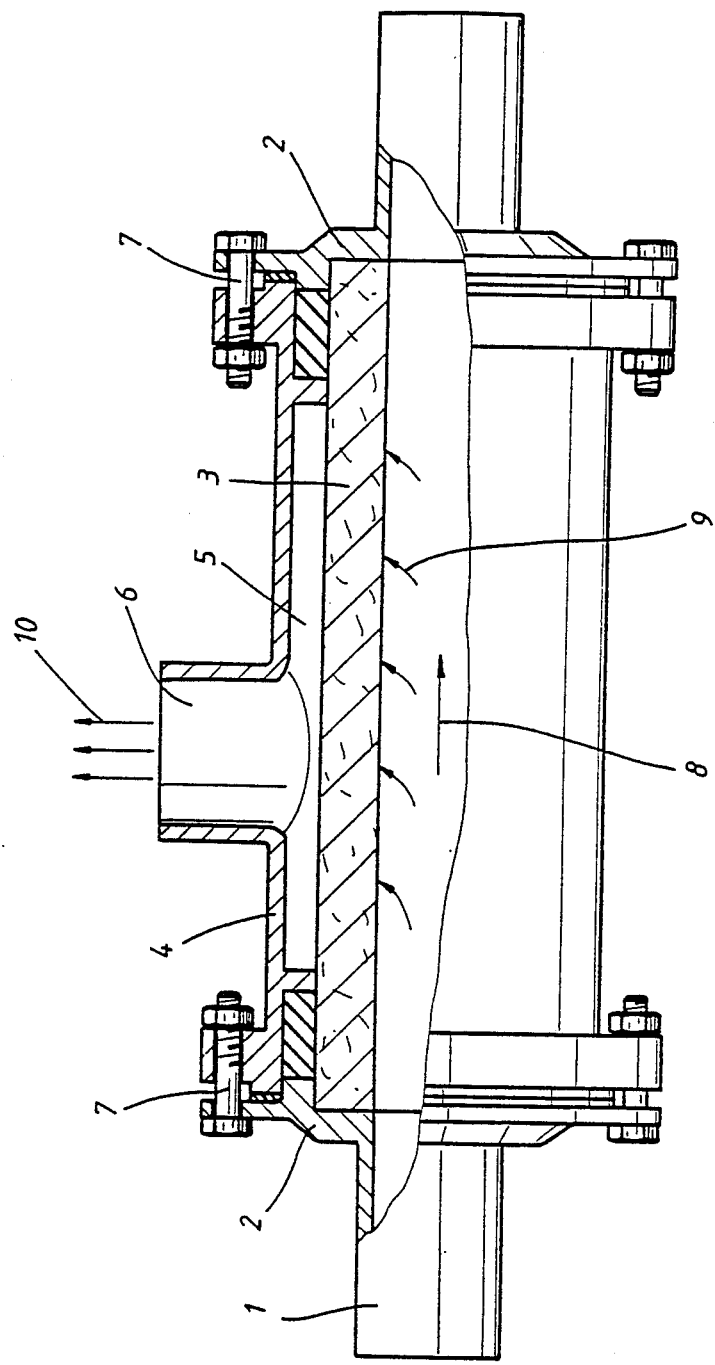

DEVICE FOR EXHAUST GAS RECIRCULATION IN DIESEL ENGINES

BACKGROUND AND SUMMARY OF THE INVENTION

The invention relates to a device for exhaust gas recirculation in diesel engines which are equipped downstream of the internal-combustion engine with a soot burn-off filter in the exhaust pipe of the exhaust gas stream, with an exhaust gas recirculation pipe which branches in the further course of the exhaust pipe and in which an exhaust filter for the recirculated exhaust gas is arranged.

Nowadays, with motor vehicles it is endeavored in principle to process the emission gases of the internal-combustion engines in such a way that the exhaust gases are discharged into the free atmosphere without any great environmental pollution. This can happen on the one hand by filter elements which clean the exhaust stream of particles to be separated out being arranged directly in the exhaust pipe of the exhaust gas stream. It is also already known in the case of internal-combustion engines to perform an exhaust gas recirculation to improve the quality of the exhaust gases. For this purpose, a part of the exhaust gases is returned via a so-called recirculation pipe from the exhaust pipe of the internal-combustion engine to its intake side.

The cleaning of the exhaust gas stream is particularly problematical in the case of diesel internal-combustion engines. The exhaust gases of the diesel engines namely contain a greater degree of solid particles, predominantly carbon particles.

These carbon particles are produced due to an incomplete combustion of the hydrocarbon fuel under certain operating conditions. In order to free the exhaust gas stream of these carbon particles in the case of diesel engines, it is also already usual to install a filter element in the exhaust pipe downstream of the internal-combustion engine. In addition, it is also already known to arrange a further filter in the exhaust gas recirculation pipe for the purpose of a still further-reaching cleaning of returned exhaust gases (European Patent Specification No. 0,010,384).

However, such a filter installed directly in the exhaust gas recirculation pipe can very easily clog at its surface with a layer of soot particles and other contaminants still entrained into the exhaust gas stream and become blocked. This can then have the result that, due to the blocked filter, considerable counter-pressures can build up in the exhaust gas stream, which can have adverse effects on the operating conditions of the engine. The danger that such a filter arranged directly in the exhaust gas recirculation pipe becomes blocked by contaminants entrained in the returned exhaust gas flow is particularly great in the case of engines which are equipped downstream of the internal-combustion engine with a soot burn-off filter in the exhaust pipe of the exhaust gas stream. These soot burn-off filters normally consist of ceramic elements which can lose their strength during prolonged use on account of the high thermal and mechanical stress. This has the consequence that very fine particles are removed from the ceramic element and carried away with the exhaust gas. These particles are then deposited on the surface of the filter in the exhaust gas recirculation pipe and can impair its serviceability even after a short time.

If there is no filter arranged in the exhaust gas recirculation pipe, the cylinder space is exposed to the action of wear particles of ceramic, which can result in failure of the engine.

An object of the invention is therefore to create a device for exhaust gas recirculation in diesel engines, in which the disadvantages specified above do not occur and the contaminants are removed reliably and to the greatest extent from the exhaust gases returned from the exhaust pipe to the internal-combustion engine.

This object is achieved according to the invention by providing an arrangement wherein the exhaust filter is arranged in the branch of the exhaust gas recirculation pipe in such a way that its surface on the contamination side lies at least approximately parallel to the direction of flow of the main exhaust gas stream and in the region and course of a normal flow line, preferably close to the wall, and the branch for the exhaust gas recirculation is fitted in the region of a pipe extension of the exhaust pipe which is restricted locally to an axial region and in the inside of which a tubular filter insert is inserted in a sealed manner, the clearance profile of which coincides in position, shape and size approximately with the clearance profile of the exhaust pipe of the main exhaust gas stream, the pipe extension enclosing the filter insert on the outside at a distance.

Especially preferred embodiments of the invention include one or more of the following advantageous features:
  i. the filter insert consists of a dimensionally stable porous pipe of sintered ceramic or of sintered metal;
  ii. the pore size of the filter in the branch of the exhaust gas recirculation pipe is 0.1 to 20 mm;
  iii. the filter-effective length of the tubular filter insert is greater than the clear diameter of the filter insert; and
  iv. the branch is arranged in relation to the direction of gravity in such a way that the direction of removal is directed at least approximately counter to the direction of gravity.

During the operation of the motor vehicle, the exhaust gases coming from the internal-combustion engine, possibly also already directed via a soot burn-off filter, flow past the surface on the contamination side of the second exhaust filter arranged in the branch of the exhaust gas recirculation pipe, a proportion of the exhaust gases being returned through the filter to the intake side of the internal-combustion engine. In the case of prolonged use of the device according to the invention, a certain coating of the surface on the contamination side with soot particles and other contaminants may occur. However, these remain of the orders of magnitude such as are known from the usual exhaust systems and which do not substantially impair the serviceability of the device. The flow of the main exhaust gas stream has the effect to a certain extent of continuously removing contaminants from the surface on the contamination side of the filter and carrying them away with the main exhaust gas stream out of the exhaust pipe.

Other objects, advantages and novel features of the present invention will become apparent from the following detailed description of the invention when considered in conjunction with the accompanying drawings.

BRIEF DESCRIPTION OF THE DRAWING

The single drawing figure shows a view of the device for exhaust gas recirculation, represented partially in sections, constructed according to a preferred embodiment of the invention.

DETAILED DESCRIPTION OF THE DRAWING

In the drawing figure, the exhaust pipe coming from the internal-combustion engine for the main exhaust gas stream is denoted by 1. A tubular filter insert 3 is inserted in the extension 2 of the exhaust pipe. The filter insert is surrounded on the outside by a locally restricted pipe extension 4, forming an annular hollow space 5 between the filter insert and the shell of the pipe extension. The returned gases, cleaned by the filter insert, are passed from this annular hollow space via the removal opening 6, directed substantially perpendicular to gravity (upwardly), via an exhaust gas recirculation pipe—not illustrated—to the intake side of the internal-combustion engine. In this arrangement, the pipe extension with the removal opening is connected by means of glands 7 gas-tightly to the filter insert. In the drawing, 8 denotes the main exhaust gas stream passing through the exhaust pipe, 9 denotes the proportion of exhaust gas which is passed through the filter insert and 10 denotes the cleaned exhaust gas stream returned to the internal-combustion engine.

The advantage of the device according to the invention for exhaust gas recirculation in diesel engines consists in particular in that the particles contained in the exhaust gas of a diesel engine (for example precisely also from the "attrition" of an upstream soot filter) are removed to the greatest extent from the returned exhaust gas stream. It is accordingly prevented with the device that such particles get into the engine with the exhaust gas recirculation, where they act as very fine abrasives and can do considerable damage in the engine. The device according to the invention also has a substantially longer service life than filter inserts which are arranged directly in an exhaust gas recirculation pipe. Such filters become clogged after only short periods of time by the carbon particles or possible other particles present in the exhaust gas stream and must therefore be regenerated or reactivated after only short intervals, as otherwise for example the defined exhaust gas recirculation rates can no longer be maintained.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Device for exhaust gas recirculation in diesel engines which are equipped downstream of the internal-combustion engine with a soot burn-off filter in the exhaust pipe of the exhaust gas stream, with an exhaust gas recirculation pipe which branches in the further course of the exhaust pipe and in which an exhaust filter for the recirculated exhaust gas is arranged, wherein the exhaust filter is arranged in the branch of the exhaust gas recirculation pipe in such a way that its surface on the contamination side lies at least approximately parallel to the direction of flow of the main exhaust gas stream and in the region and course of a normal flow line, preferably close to the wall, and the branch for the exhaust gas recirculation is fitted in the region of a pipe extension of the exhaust pipe which is restricted locally to an axial region and in the inside of which a tubular filter insert is inserted in a sealed manner, said insert having a clearance profile which coincides in position, shape and size approximately with the clearance profile of the exhaust pipe of the main exhaust gas stream, the pipe extension enclosing the filter insert on the outside at a distance.

2. Exhaust gas recirculation device according to claim 1, wherein the filter insert, consists of a dimensionally stable porous pipe of sintered ceramic or of sintered metal.

3. Exhaust gas recirculation device according to claim 1, wherein the pore size of the filter in the branch of the exhaust gas recirculation pipe is 0.1 to 20 $\mu$m.

4. Exhaust gas recirculation device according to claim 2, wherein the pore size of the filter in the branch of the exhaust gas recirculation pipe is 0.1 to 20 $\mu$m.

5. Exhaust gas recirculation device according to claim 1, wherein the filter-effective length of the tubular filter insert is greater than the clear diameter of the filter insert.

6. Exhaust gas recirculation device according to claim 2, wherein the filter-effective length of the tubular filter insert is greater than the clear diameter of the filter insert.

7. Exhaust gas recirculation device according to claim 4, wherein the filter-effective length of the tubular filter insert is greater than the clear diameter of the filter insert.

8. Exhaust gas recirculation device according to claim 1, wherein the branch is arranged in relation to the direction of gravity in such a way that the direction of removal is directed at least approximately counter to the direction of gravity.

9. Exhaust gas recirculation device according to claim 2, wherein the branch is arranged in relation to the direction of gravity in such a way that the direction of removal is directed at least approximately counter to the direction of gravity.

10. Exhaust gas recirculation device according to claim 4, wherein the branch is arranged in relation to the direction of gravity in such a way that the direction of removal is directed at least approximately counter to the direction of gravity.

11. Exhaust gas recirculation device according to claim 5, wherein the branch is arranged in relation to the direction of gravity in such a way that the direction of removal is directed at least approximately counter to the direction of gravity.

* * * * *